United States Patent [19]

Jaudt

[11] 4,170,321

[45] Oct. 9, 1979

[54] BUCKET WHEEL SLUICE HAVING MESH-ENGAGED REMOVAL UNIT

[76] Inventor: Andreas Jaudt, Schongauerstrasse 10 c, D-8900 Augsburg, Fed. Rep. of Germany

[21] Appl. No.: 895,179

[22] Filed: Apr. 10, 1978

[30] Foreign Application Priority Data

Jul. 27, 1977 [DE] Fed. Rep. of Germany ....... 2733808

[51] Int. Cl.² .............................................. G01F 11/24
[52] U.S. Cl. ...................................... 222/220; 222/368
[58] Field of Search .................... 214/17 CC; 222/220, 222/342, 368

[56] References Cited

U.S. PATENT DOCUMENTS

| | | | |
|---|---|---|---|
| 1,515,993 | 11/1924 | Beyer | 222/220 |
| 2,732,086 | 1/1956 | Schnyder | 222/342 X |
| 3,203,601 | 8/1965 | Carson | 222/342 X |
| 3,630,416 | 12/1971 | Weisselberg et al. | 222/220 |

Primary Examiner—David A. Scherbel
Attorney, Agent, or Firm—Pollock, VandeSande and Priddy

[57] ABSTRACT

The periphery of a bucket wheel sluice is provided with a plurality of vanes forming pockets for the reception and transport of material, the vanes and intervening spaces being shaped and arranged in an involute tooth configuration. A removal unit is provided to facilitate removal of material from the pockets, and comprises at least two spaced discs of involute tooth configuration in mesh engagement with the bucket wheel periphery, and having a plurality of elongated rods or blades extending between corresponding teeth of the spaced discs for passage through each of the bucket wheel pockets to mechanically remove any material entrapped therein.

12 Claims, 3 Drawing Figures

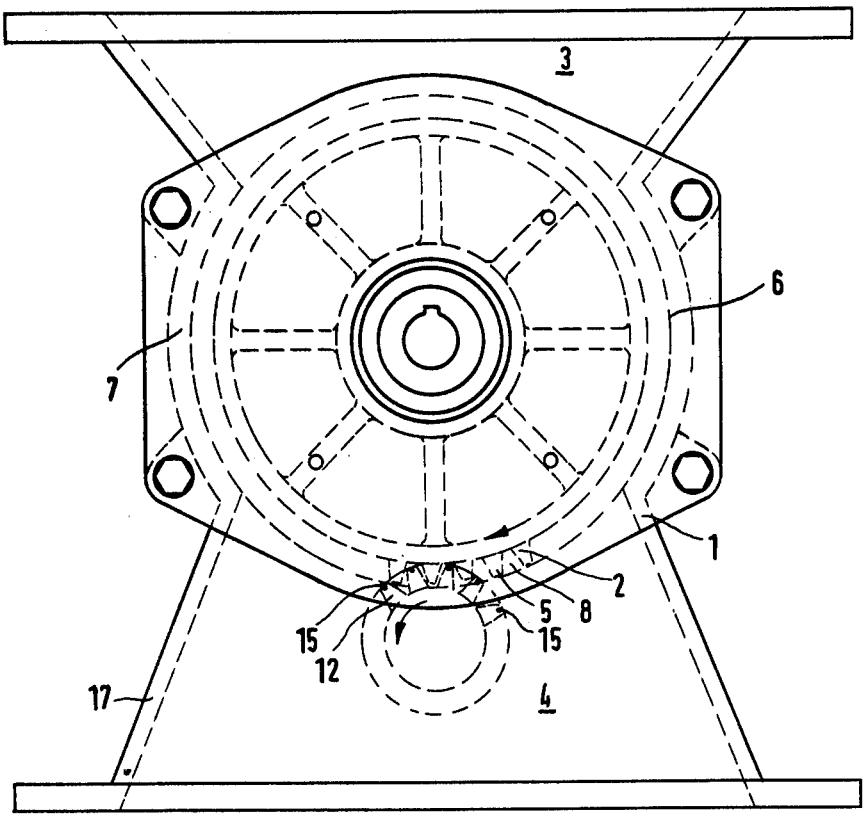

BUCKET WHEEL SLUICE HAVING MESH-ENGAGED REMOVAL UNIT

BACKGROUND OF THE INVENTION

The present invention relates to a bucket wheel sluice comprising a sluice wheel which rotates within a housing and which has a plurality of outstanding vanes that glide across and sealingly engage opposed curved walls located between a housing intake and a housing outlet; and is more particularly concerned with an apparatus of the type described wherein a mechanical removal unit is provided for rotation with the bucket wheel, said removal unit having elongated elements which extend generally parallel to the axis of rotation of the bucket wheel and which pass successively through successive pockets of the bucket wheel to remove any entrapped material therein for discharge at the bucket wheel outlet.

Bucket wheel sluices have been suggested heretofore which have plural pockets formed on the periphery of the wheel for the reception of material at a housing inlet, and for transport of such material to a housing outlet. In such arrangements, it is highly desirable to provide a relatively large difference in pressure between the inlet (or intake) and outlet (or discharge) of the bucket wheel sluice. In order to achieve this operating characteristic, the bucket wheel sluice must be provided with a relatively large number of vanes which sealingly engage the housing walls between the housing inlet and outlet, and the necessary seal can be accomplished most advantageously if the pockets which are formed between the sealing vanes have a relatively small profile. If an arrangement of this type is provided, however, and the bucket wheel sluice is to be used for conveying loose material that does not readily flow, a problem arises in that the pockets at the periphery of the sluice do not drain completely empty at the housing discharge.

In an attempt to rectify the foregoing problem, it has been suggested heretofore that a pneumatic removal unit be provided for blasting the pockets free of entrapped material at the discharge side of the housing. The specific arrangements which have been normally employed for this purpose heretofore, however, have been so constructed that it is no longer feasible to maintain a large difference in pressure between the intake and discharge side of the housing. It has been further suggested that the pockets of the bucket wheel surface have a cup-shaped, preferably semi-circular, profile to minimize the entrapment of material within the pockets and to permit such material to drop freely from the pockets at the housing discharge; but even when arrangements of this type are employed it has still been found that when certain materials that do not readily flow are being transported, the material will still not drain from the cup-shaped pockets, or will only partially drain therefrom at the housing outlet.

The principal object of the present invention is, accordingly, to provide a bucket wheel sluice which is so constructed that a relatively large difference in pressure can be readily achieved between the intake and discharge side of the apparatus, and wherein materials, including materials that do not readily flow, will be completely and efficiently removed from the sluice wheel pockets at the discharge side of the housing.

SUMMARY OF THE INVENTION

A bucket wheel sluice constructed in accordance with the present invention comprises a housing having an inlet and outlet separated from one another by intervening curved walls. A cylindrical sluice wheel is mounted for rotation within the housing between said inlet and outlet, and the periphery of the wheel has a plurality of parallel, spaced, relatively closely adjacent outwardly projecting vanes which pass along and sealing engage the curved housing walls between the housing inlet and outlet to provide an excellent seal between said inlet and outlet so that a relatively large pressure difference may be readily effected and maintained therebetween.

Adjacent ones of the aforementioned elongated vanes, and the spaces therebetween, define pockets for the reception of material at the housing inlet and for delivery of such material to the housing outlet as the sluice wheel rotates. The cross-sectional profile of these pockets is not cup-shaped or semi-circular, as has been suggested heretofore; and, instead, the periphery of the sluice wheel as defined by the vanes and their intervening spaces is of toothed-gear configuration, preferably of involute tooth design. A gear-type removal unit mesh engages the sluice wheel periphery adjacent the housing outlet, for rotation with the sluice wheel about an axis parallel to the axis of rotation of the sluice wheel, to facilitate the discharge of material from the pockets at the housing outlet.

In the preferred embodiment of the invention, the removal unit comprises a plurality of comparatively thin parallel discs mounted in spaced relation to one another on a rotatable support tube. Each disc has a peripheral toothed gear configuration which is complementary to the peripheral toothed gear configuration of the sluice, and a plurality of elongated elements extend respectively between corresponding teeth of the said discs in directions generally parallel to the axes of rotation of the sluice wheel and discs. The elongated elements may comprise rods which are attached to the crowns of corresponding teeth in the spaced discs, or elongated blades which extend between the trailing edges of corresponding teeth in said spaced discs as viewed in the direction of rotation of the discs. In either case the elongated elements pass successively through the successive pockets of the sluice wheel at the housing outlet, in a rolling motion which is characteristic of meshed gears of involute tooth configuration, to mechanically remove any entrapped material from the pockets of the sluice wheel for delivery to the housing outlet.

The arrangement preferably also includes means for selectively adjusting the radial distance between the axes of rotation of the sluice wheel and removal unit so that proper operation of the device, as viewed through a housing window located adjacent the housing outlet, can be readily achieved. In the specific embodiment to be described, the adjustability feature is achieved by providing conical bushings at the opposing ends of the aforementioned support tube, and cooperating axially adjustable conical bearing bolts in engagement with said bushings.

BRIEF DESCRIPTION OF THE DRAWINGS

The foregoing objects, advantages, construction and operation of the present invention will become more readily apparent from the following description and accompanying drawings where.

DESCRIPTION OF THE PREFERRED EMBODIMENTS

Figure 1:
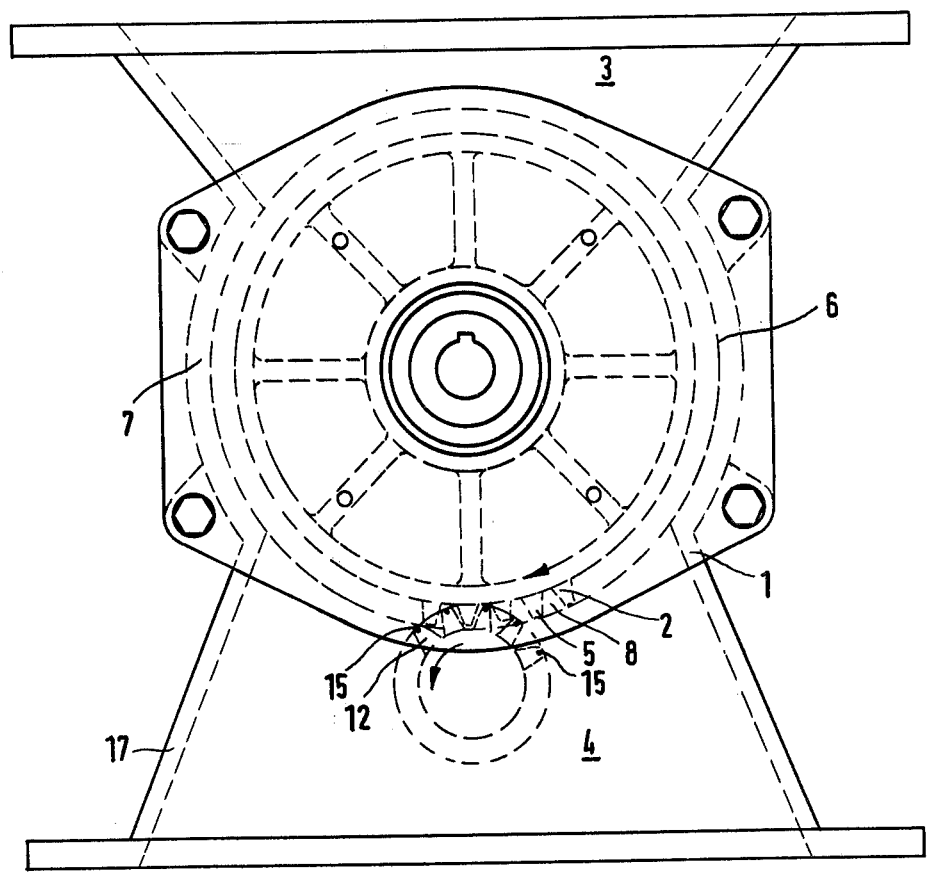
FIG. 1 is an end view of a bucket wheel sluice constructed in accordance with the present invention.

Referring to the several figures, like numerals of which refer to like parts throughout, a bucket wheel sluice constructed in accordance with the present invention comprises a housing 1 having a cylindrical sluice wheel 2 mounted for rotation therein between the inlet or intake side 3 of the housing and the outlet or discharge side 4 of said housing. The periphery of sluice wheel 2 is provided with a plurality of elongated vanes 5 that are disposed closely adjacent and generally parallel to one another in directions parallel to the axis of rotation of sluice wheel 2. Vanes 5 are so shaped, relatively located, and dimensioned as to provide the periphery of sluice wheel 2 with a toothed gear configuration, preferably one of involute tooth design; and the tips of the various vanes or teeth 5 glide across opposed curved housing walls 6, 7, which are located between the housing inlet 3 and housing outlet 4, and sealingly engage the walls 6, 7 as sluice wheel 2 is rotated, e.g. by an appropriate motor (not shown) which is coupled to the hub of sluice wheel 2 directly or through an appropriate gear box.

In the particular embodiment of the invention illustrated in FIG. 1, the sluice wheel contains forty-four teeth 5 arranged in an involute tooth system. The space between each pair of adjacent teeth forms a pocket 8 which receives material at the housing inlet 3 and which, by rotation of sluice wheel 2, delivers such material to housing outlet 4 for discharge at said outlet e.g. under the influence of gravity.

In order to facilitate the discharge of material from the pockets 5 at housing 4, a rotatable mechanical removal unit is located adjacent the sluice wheel at the housing outlet. This removal unit comprises an elongated support tube 9 which is mounted for rotation on an axis parallel to the axis of rotation of the sluice wheel 2, by bearing bolts 10 which are affixed to housing 1 and which engage the opposing ends of support tube 9. A plurality of comparatively thin, disc-shaped tooth wheels 12 are mounted on support tube 9 and maintained in uniformly spaced relation to one another on tube 9 by means of intervening spacer sleeves 11. The several spaced discs 12 extend across an axial dimension which is at least equal to the discharge width of the sluice wheel 2. The number of the toothed wheels 12 which is provided on tube 9 is selected in accordance with the flowability of the loose material which is to be conveyed by sluice wheel 2 between portions 3 and 4 of housing 1.

Figure 3:
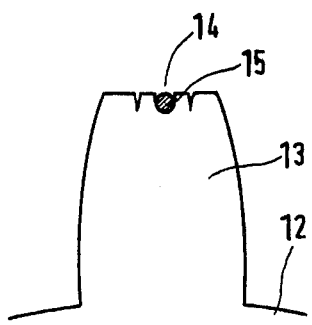
FIG. 3 is a detail side view of one tooth in one of the removal unit discs of FIG. 2, illustrating how an elongated rod element may be fastened thereto.

The several toothed wheels 12 are all provided with peripheral teeth 13 (See FIG. 3) of involute tooth design which mesh engage the toothed-gear configuration at the periphery of sluice wheel 2. Each disc 12 has the same number of teeth 13, and the several teeth 13 on each disc are mounted in axial alignment with the corresponding teeth 13 on the others of said discs 12. Each tooth 13 is provided at its crown with a slot 14 into which is inserted an elongated rod 15 that interconnects the aligned teeth 13 of the several toothed wheels 12 with one another at their respective crowns. To ensure a secure seating of the rods 15, the edges of the slots 14 are pinched inwardly onto rod 15 as illustrated in FIG. 3.

The rods 15 serve as removal devices which, upon rotation of the toothed wheels 12 adjacent the discharge region of housing 1, pass through each of the pockets 8 in a rolling motion characteristic of involute tooth systems, to completely empty the pockets 8 of any material which may be entrapped therein. Due to the involute tooth design which is employed, material in the pockets 8 will be substantially completely removed therefrom within the region of mesh between sluice wheel 2 and the toothed wheels 12. While the material, so freed, will ordinarily then drop under the influence of gravity into discharge 4, it has also been found that, where the material that is being transported in pockets 8 constitutes loose materials having very poor flow characteristics, the toothed wheels 12 and the associated rods 15 act to physically convey such materials out of the pockets. The removal unit of the present invention accordingly provides the desired emptying of pockets 8 even in those cases where the flow characteristics of the materials therein are very poor.

Instead of providing elongated rods 15 at the crowns of the corresponding teeth 13, other types of elongated elements extending between the teeth 13 in the several discs 12 may be employed. By way of example, the elongated elements can take the form of elongated blades which extend between teeth 13 in directions generally parallel to the axes of rotation of the sluice wheel and removal unit. Where such blade-type elongated elements are employed, the elongated blades are preferably located adjacent the rear sides or trailing edges of the teeth 13 as viewed in the direction of rotation of the removal unit, to interconnect the toothed wheels 12 to one another at the trailing edges of their respective teeth 13.

The housing 1 is provided at its discharge side with a window 17 so that the operation of the removal unit can be readily monitored. Means are preferably provided for selectively adjusting the radial distance between the axes of rotation of the sluice wheel and of the removal unit, so that, as the operation of the removal unit is monitored through window 17, adjustments can be made to assure complete removal of material from the pockets 8. In the preferred embodiment of the invention illustrated in FIG. 2, this type of adjustment is achieved by providing the opposing ends of support tube 9 with tapered bushings 16 which are engaged by bearing bolts 10, that, in turn, are of conical configuration. The bearing bolts 10 are axially adjustable in position so that, by variation of their positions relative to bushings 16, the radial distance between the axes of rotation of sluice wheel 2 and of support tube 9 can be selectively varied.

Figure 2:
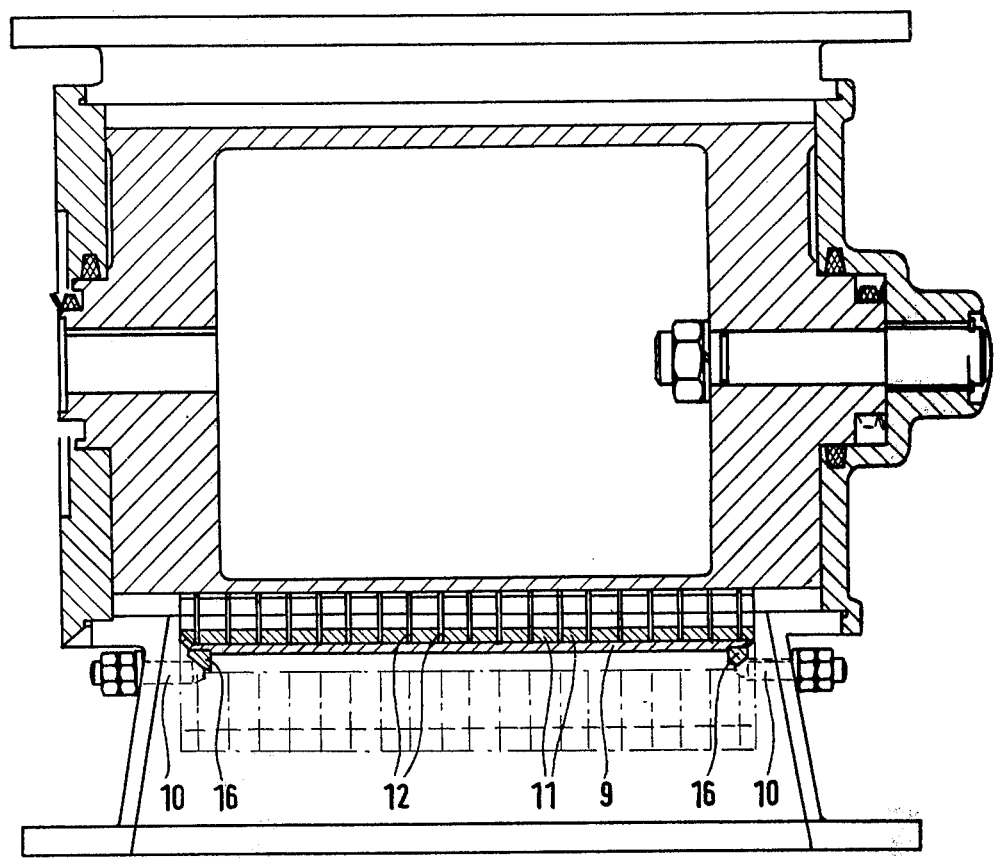
FIG. 2 is a longitudinal cross-sectional view of the bucket wheel sluice shown in FIG. 1.

In the particular embodiment shown in FIG. 2, a comparatively large number of thin, disc-shaped toothed wheels 12 are provided. The wheels 12, in this embodiment, may constitute elements which are punched from sheet metal. If the discharge width of sluice wheel 2 is comparatively narrow, however, the large number of disc-shaped toothed wheels 12 shown in FIG. 2 are no longer necessary, and, instead, only two comparatively sturdy toothed wheels need be provided at respective positions beyond the ends of the area of discharge of the sluice wheel 2. In this latter embodiment, the two toothed wheels will still mesh with the periphery of sluice wheel 2, and are still interconnected with one another at the crowns of the corresponding teeth 13 by elongated rods 15 (or by blade-type elongated elements as described previously). In addition, depending upon the strength characteristics which are necessary in the overall structure, it is also possible to provide a comparatively few, thin, disc-shaped toothed wheels 12 between the aforementioned two sturdy toothed wheels, and within the area of discharge of the sluice wheel 2, with the removal rods 15 also being connected to the crowns of the teeth in these intervening toothed wheels.

The removal unit does not require a separate drive since it is rotated automatically by the mesh engagement of teeth 13 with the periphery of sluice wheel 2.

While I have thus described a preferred embodiment of the present invention, many variations will be apparent to those skilled. It must therefore be understood that the foregoing description is intended to be illustrative only and not limitative of the present invention, and all such variations and modifications as are in accord with the principles described are meant to fall within the scope of the appended claims.

Having thus described my invention, I claim:

1. A bucket wheel sluice comprising a housing having an inlet and outlet separated from one another by intervening curved walls, a sluice wheel mounted for rotation within said housing between said inlet and said outlet, the periphery of said sluice wheel having a plurality of spaced outwardly projecting vanes which pass along and sealingly engage said curved walls during rotation of said sluice wheel, adjacent ones of said vanes defining pockets therebetween for the reception of material at said housing inlet and for delivery of such material to said housing outlet as said sluice wheel rotates, the periphery of said sluice wheel as defined by said vanes and the spaces therebetween being of toothed gear configuration, and a removal unit for facilitating the discharge of material from said pockets at said housing outlet comprising a plurality of parallel discs spaced from one another and mounted for rotation adjacent said housing oulet about an axis that is parallel to the axis of rotation of said sluice wheel, each of said discs having a peripheral toothed gear configuration which is complementary to the peripheral toothed gear configuration of said sluice wheel and which is in mesh engagement with said periphery of said sluice wheel, said removal unit including a plurality of elongated elements extending in directions generally parallel to the axes of rotation of said sluice wheel and discs and located respectively between corresponding teeth of said spaced discs, said elongated elements passing successively through the successive pockets of said sluice wheel at said housing outlet during rotation of said mesh-engaged sluice wheel and discs to mechanically remove any entrapped material from said pockets of said sluice wheel for delivery to said housing outlet.

2. The structure of claim 1 wherein the gear configurations of the said peripheries of said discs and of said sluice wheel are each of involute tooth configuration.

3. The structure of claim 2 wherein said elongated elements comprise rods which respectively interconnect corresponding teeth of each of said discs to one another.

4. The structure of claim 3 wherein said rods are respectively connected to the crowns of said corresponding teeth.

5. The structure of claim 2 wherein said elongated elements comprise blades which respectively interconnect corresponding teeth of each of said discs to one another.

6. The structure of claim 5 wherein said blades are connected to the trailing edges of said corresponding teeth relative to the direction or rotation of said discs.

7. The structure of claim 1 wherein said discs are affixed in spaced relation to one another on an elongated support tube, said tube being mounted for rotation about its axis of elongation.

8. The structure of claim 7 wherein said plurality of discs constitutes two discs axially spaced from one another and located respectively adjacent the ends of the discharge region of each of said pockets.

9. The structure of claim 7 wherein said plurality of discs constitutes in excess of two discs separated from one another by intervening spacers, each of said discs being of comparatively thin sheet-metal construction, at least one of said discs being axially located between the ends of the discharge region of each of said pockets.

10. The structure of claim 7 wherein the opposing ends of said support tube are provided with conical bushings, and a pair of conical bearing bolts in engagement with said bushings respectively, the positions of said conical bolts being axially adjustable relative to one another and relative to the opposing ends of said support tube.

11. The structure of claim 1 including means for selectively adjusting the radial distance between the axes of rotation of said sluice wheel and of said removal unit.

12. The structure of claim 1 wherein rotation of said discs is effected solely by rotation of said sluice wheel.

* * * * *